(12) United States Patent
Castinado et al.

(10) Patent No.: US 11,966,914 B2
(45) Date of Patent: Apr. 23, 2024

(54) REAL-TIME PROCESSING DISTRIBUTED LEDGER SYSTEM

(71) Applicant: BANK OF AMERICA CORPORATION, Charlotte, NC (US)

(72) Inventors: Joseph Benjamin Castinado, North Glenn, CO (US); Charles Russell Kendall, Snoqualmie, WA (US); Martha Sain McClellan, Lancaster, SC (US); Lee Ann Proud, Ponte Vedra, FL (US); Ayeesha Sachedina, New York, NY (US); Calvin William Tackett, Jr., Rowlett, TX (US)

(73) Assignee: BANK OF AMERICA CORPORATION, Charlotte, NC (US)

(*) Notice: Subject to any disclaimer, the term of this patent is extended or adjusted under 35 U.S.C. 154(b) by 109 days.

(21) Appl. No.: 17/896,212

(22) Filed: Aug. 26, 2022

(65) Prior Publication Data

US 2022/0414651 A1    Dec. 29, 2022

Related U.S. Application Data

(63) Continuation of application No. 16/564,781, filed on Sep. 9, 2019, now Pat. No. 11,475,438, which is a (Continued)

(51) Int. Cl.
*G06Q 20/38* (2012.01)
*G06F 16/18* (2019.01)
(Continued)

(52) U.S. Cl.
CPC ....... *G06Q 20/382* (2013.01); *G06F 16/1815* (2019.01); *G06F 16/182* (2019.01);
(Continued)

(58) Field of Classification Search
None
See application file for complete search history.

(56) References Cited

U.S. PATENT DOCUMENTS

2015/0206106 A1    7/2015  Yago
2016/0335628 A1    11/2016 Weigold
(Continued)

FOREIGN PATENT DOCUMENTS

EP    3073670 A1    9/2016
WO    2016163608 A1    10/2016

OTHER PUBLICATIONS

Mills, David et al. (2016 "Distributed ledger technology in payments, clearing and settlement," Finance and Economics Discussion Series 2016-095. Washington: Board of Governors of the Federal Reserve System, https://doi.org/10.17016/FEDS.2016.095.

*Primary Examiner* — Jamie R Kucab
(74) *Attorney, Agent, or Firm* — Moore & Van Allen PLLC; Seongun M. Hong

(57) ABSTRACT

A system, computer program product, and method for executing real-time processing of resource transfers using distributed ledger technology is provided. In particular, the system utilizes a private or semi-private blockchain to create a distributed ledger which comprises a record of all resource transfers between a number of entities. The real-time processing system addresses a number of computer technology-centric challenges associated with executing resource transfers. In particular, executing resource transfers on a real-time basis allows the nodes of the blockchain to more evenly distribute computing workload over time when compared to more traditional resource transfer systems that use batch processing to execute transfers.

18 Claims, 3 Drawing Sheets

Related U.S. Application Data continuation of application No. 15/659,215, filed on Jul. 25, 2017, now Pat. No. 10,643,202.

(51) Int. Cl.
*G06F 16/182* (2019.01)
*G06Q 20/22* (2012.01)
*G06Q 20/40* (2012.01)
*G06Q 40/02* (2023.01)

(52) U.S. Cl.
CPC ....... *G06Q 20/223* (2013.01); *G06Q 20/3829* (2013.01); *G06Q 20/389* (2013.01); *G06Q 20/401* (2013.01); *G06Q 40/02* (2013.01)

(56) References Cited

U.S. PATENT DOCUMENTS

| | | |
|---|---|---|
| 2016/0342976 A1 | 11/2016 | Davis |
| 2016/0342989 A1 | 11/2016 | Davis |
| 2017/0046694 A1* | 2/2017 | Chow .................... G06Q 50/08 |
| 2017/0132625 A1 | 5/2017 | Kennedy |
| 2017/0148016 A1 | 5/2017 | Davis |
| 2017/0316390 A1* | 11/2017 | Smith ................... H04L 9/0891 |
| 2017/0316391 A1* | 11/2017 | Peikert ................ G06Q 20/405 |
| 2018/0101842 A1* | 4/2018 | Ventura ................ G06Q 10/087 |
| 2018/0219946 A1* | 8/2018 | Farrahi Moghaddam ................... H04L 67/1095 |
| 2018/0276626 A1* | 9/2018 | Laiben ............... G06Q 20/3829 |
| 2018/0294967 A1* | 10/2018 | Roberts ................. H04L 9/3255 |
| 2019/0130394 A1* | 5/2019 | Stollman ............. G06F 16/2365 |

* cited by examiner

REAL-TIME PROCESSING DISTRIBUTED LEDGER SYSTEM

CROSS-REFERENCE TO RELATED APPLICATIONS

This application is continuation of U.S. patent application Ser. No. 16/564,781, filed Sep. 9, 2019, entitled "Real-Time Processing Distributed Ledger System," which in turn is a continuation filing of U.S. patent application Ser. No. 15/659,215 filed Jul. 25, 2017, entitled "Real-Time Processing Distributed Ledger System," the contents of which are hereby incorporated by reference.

FIELD OF THE INVENTION

The present invention embraces a system, computer program product, and method for executing real-time processing of resource transfers using distributed ledger technology.

BACKGROUND

In conducting resource transfers, users may utilize computing systems to transfer resources from one user to another. However, conventional resource transfer systems typically utilize batch processing to execute the resource transfers and is thus ill-suited to provide real-time processing of resource transfers. Accordingly, there is a need for an efficient and secure way of executing and validating resource transfers in real-time or near real-time.

BRIEF SUMMARY

The following presents a simplified summary of one or more embodiments of the invention in order to provide a basic understanding of such embodiments. This summary is not an extensive overview of all contemplated embodiments, and is intended to neither identify key or critical elements of all embodiments, nor delineate the scope of any or all embodiments. Its sole purpose is to present some concepts of one or more embodiments in a simplified form as a prelude to the more detailed description that is presented later.

A distributed ledger is created to provide a secure and expedient way to maintain an electronic record of resource transfers. Data records may be written to the distributed ledger to reflect various states of the resource transfer and may include the information necessary to execute the resource transfer, such as the amount of resources to be transferred and the channel through which the resources are to be sent. Authorized access to a select number of data records 15may automatically be granted to certain third parties based on smart logic code.

Embodiments of the present invention provide a system, computer program product, and computer-implemented method for executing a real-time resource transfer using distributed ledger technology. In some embodiments, the invention is configured to generate a pending data record on the blockchain; validate the pending data record for a first entity; detect that the pending data record has been validated by a second entity; convert the pending data record to a permanent data record; and append the permanent data record to the blockchain.

In some embodiments, the invention is further configured to read the data within the permanent data record; detect that data within the permanent data record references an amount of resources over a threshold; and selectively authorize a third party computing system to access the permanent data record.

In some embodiments, validating the pending data record for the first entity comprises verifying that a threshold number of first entity nodes have validated the pending data record.

In some embodiments, detecting that the pending data record has been validated by the second entity comprises verifying that a threshold number of second entity nodes have validated the pending data record.

In some embodiments, the pending data record comprises identifier data, the identifier data comprising a unique identifier associated with a user and a unique identifier associated with a recipient.

In some embodiments, the unique identifier associated with a user is associated with an account of the user with the first entity, wherein the unique identifier associated with the recipient is associated with an account of the recipient with the second entity.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Figure 1:
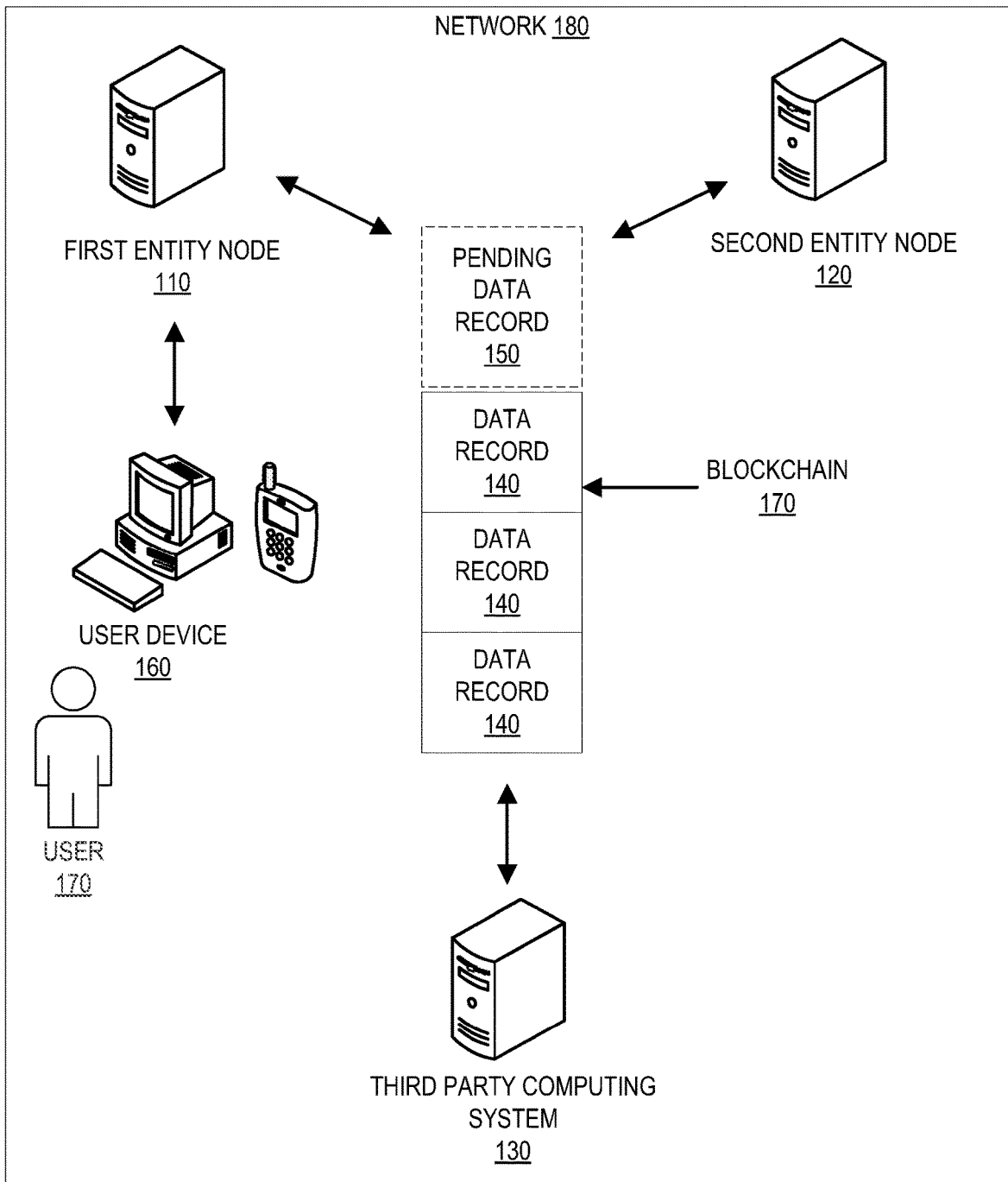
Figure 2:
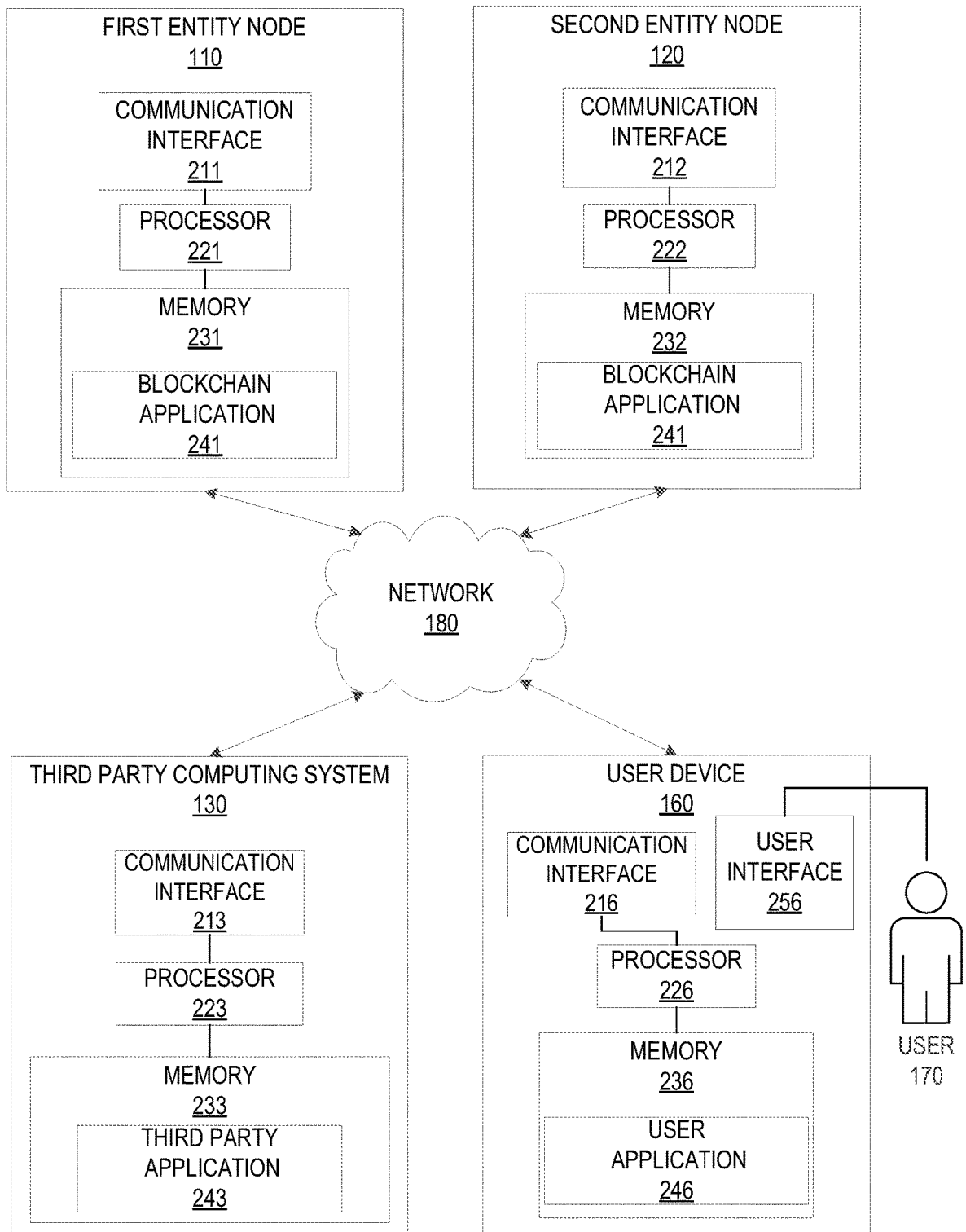
Figure 3:
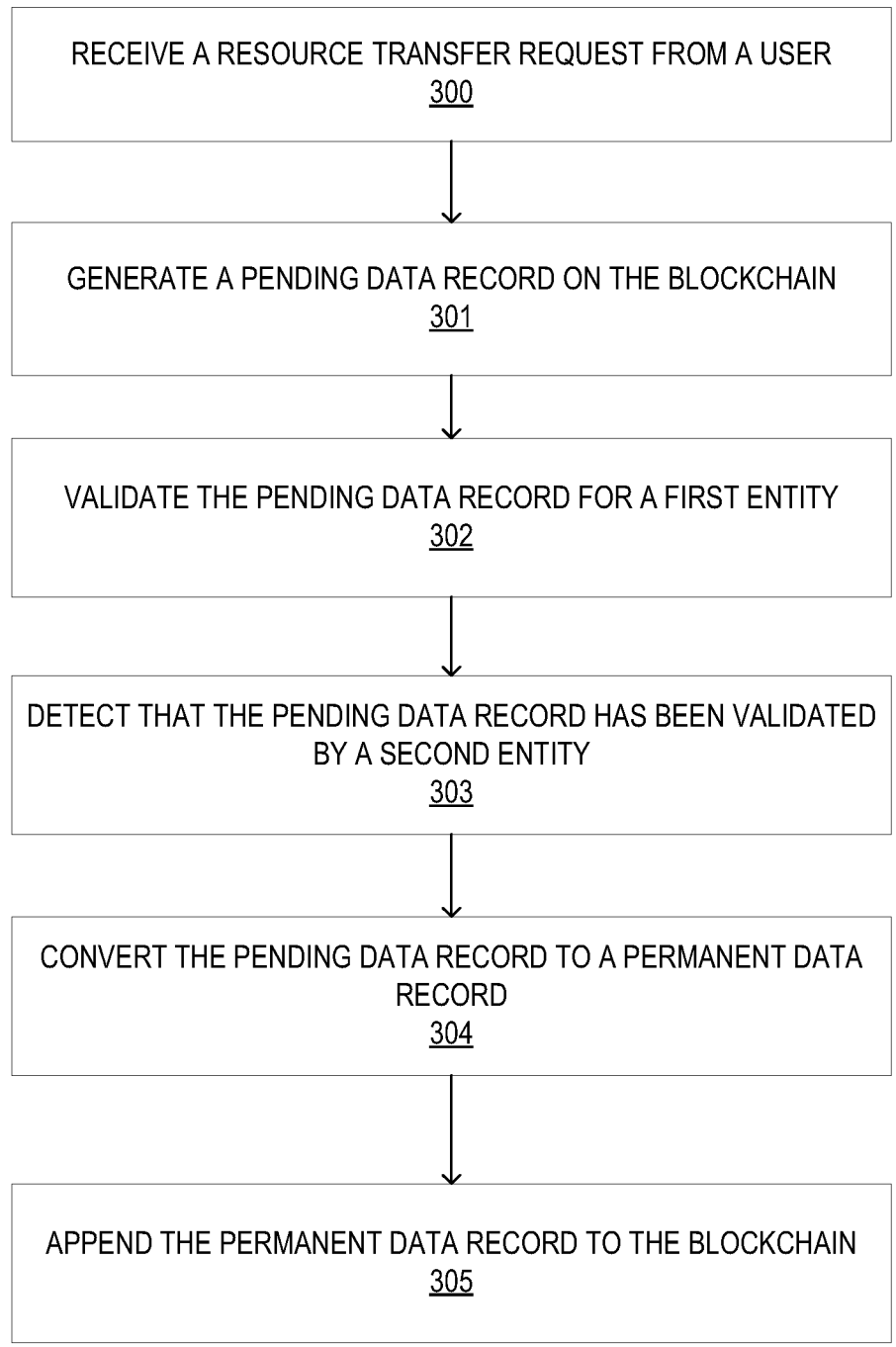

Having thus described embodiments of the invention in general terms, reference will now be made to the accompanying drawings, wherein:

FIG. 1 depicts an operating environment, in accordance with one embodiment of the present invention;

FIG. 2 depicts a block diagram illustrating the computing devices within the operating environment in more detail, in accordance with one embodiment of the present invention; and FIG. 3 illustrates a process flow for executing a real-time resource transfer using a distributed ledger, in accordance with one embodiment of the present invention.

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to elements throughout. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein.

"Entity" as used herein may refer to an individual or an organization that owns and/or operates a system of networked computing devices and/or systems on which at least a part of the distributed ledger is implemented. The entity may be a business organization, a non-profit organization, a government organization, and the like. Typically, the distributed ledger exists on the computing systems of a plurality of entities.

"User" as used herein may refer to an individual who may log onto the system to utilize the distributed ledger to perform a real-time resource transfer. Typically, the user is authorized and/or authenticated by one or more entities to access the system. Accordingly, the user may be a customer of an entity who owns an account within the entity's system. Alternatively, the user may also be an employee of the entity.

"Computing system" as used herein may refer to a networked computing device on which the distributed ledger is implemented. The computing system may include a processor, a non-transitory storage medium, a communications device, and a display. The computing system may support user logins and inputs from any combination of similar or disparate devices. Accordingly, the computing system may be a portable electronic device such as a smartphone, tablet, or laptop, or the computing may be a stationary unit such as a personal desktop computer or networked terminal within an entity's premises. In some embodiments, the computing system may be a local or remote server which is configured to send and/or receive inputs from other computing systems on the network.

"Account" as used herein may refer to a personalized record kept within an entity on behalf of a user. Each account is associated with a specific authorized user and contains information on resources owned by the user and held by the entity.

"Resource" as used herein may refer to an object under the ownership of a user which is stored or maintained by the entity on the user's behalf. The resource may be intangible or tangible objects such as data files, documents, biographical data, funds, and the like. Typically, the user's account contains records of the resources owned by the user. Account data may be stored in an account database within the entity's systems.

"Blockchain" as used herein refers to a distributed ledger of data records which are authenticated by a consensus mechanism. Multiple computing systems within the blockchain, referred to herein as "nodes" or "compute nodes," each comprise a copy of the entire ledger of records. Nodes may write a "block" to the blockchain, where the block may comprise data and metadata, including a reference to the previous "block" in the chain. In some embodiments, a "data record" may be a block on the blockchain. By linking blocks in this way, the blockchain creates a durable history of all relevant records of data and transactions between entities. In some embodiments, the data may relate to a financial transaction. In some embodiments, the data may be files or records belonging to an individual or entity. In some embodiments, the block may further comprise a time stamp and a pointer to the previous block in the chain, where the pointer may be a fix-length hash generated by a hash algorithm. In this way, the order of the blocks in history may be preserved. In some embodiments, the block may further comprise metadata indicating the node that was the originator of the transaction. In this way, the entire record of transactions is not dependent on a single database which may serve as a single point of failure; the blockchain will persist so long as the nodes on the blockchain persist.

A "private blockchain" as used herein is a blockchain in which only authorized nodes may access the blockchain. In some embodiments, nodes must be authorized to write to the blockchain. In some embodiments, nodes must also be authorized to read from the blockchain. In some embodiments, once a data record is written to the blockchain, it will be considered pending and awaiting authentication by one or more nodes in the blockchain. Typically, the authentication will be accomplished by a consensus mechanism, in which a threshold number of nodes belonging to one or more entities must validate a pending data record before it is written to the blockchain.

Embodiments of the present invention provide a system, computer program product, and method for executing real-time processing of resource transfers using distributed ledger technology. In particular, the system utilizes a private or semi-private blockchain to create a distributed ledger which comprises a record of all resource transfers between a number of entities. In a typical embodiment, a first user having an account with a first entity utilizes the system to execute a resource transfer to a second user. In some embodiments, the second user may have an account with the first entity. In other embodiments, the second user may have an account with a distinct second entity. The first entity and the second entity may each have a plurality of computing systems which serve as nodes of the blockchain. In such an embodiment, the first user may utilize the system to request that resources be transferred to the account of the second user, where the account is held with the second entity. Upon receiving the request, the nodes of the first entity and the nodes of the second entity validate the resource transfer by a consensus mechanism. Once the resource transfer is validated, a data record of the resource transfer is added to the blockchain. The data record may contain information such as the time of the transaction, the accounts involved in the transaction, and the amount of resources transferred. In this way, the system provides a secure and efficient way to conduct resource transfers on a real-time or near real-time basis.

The real-time processing system addresses a number of computer technology-centric challenges associated with executing resource transfers. In particular, executing resource transfers on a real-time basis allows the nodes of the blockchain to more evenly distribute computing workload over time when compared to more traditional resource transfer systems that use batch processing to execute transfers. In this way, the system increases the computing efficiency of the computing systems involved in the resource transfer by reducing the demand for computing resources, which may include processing power, memory space, storage space, cache space, electric power, and networking bandwidth. Furthermore, utilizing a private or semi-private blockchain in this manner provides a secure yet flexible way to selectively provide access to the data records within the blockchain to certain entities and/or users. The blockchain provides an immutable history of data records which is resistant to tampering, and eliminates much of the back-and-forth communication between computing systems that is often necessary to confirm resource transfers.

FIG. 1 is a block diagram illustrating an operating environment 001, in accordance with one embodiment of the present invention. The operating environment may include a first entity node 110 in operative communication with a second entity node 120 over a network 180. The first entity node 110 may further be in operative communication with a user device 160 over the network 180. The network 180 may, for example, be a global area network (GAN), such as the Internet, a wide area network (WAN), a local area network (LAN), or any other type of network or combination of networks. The network 180 may provide for wireline, wireless, or a combination wireline and wireless communication between the various devices and computing systems on the network 180.

Typically, the first entity node 110 is owned and/or operated by a first entity, and the second entity node 120 is owned and/or operated by a second entity. It should be understood to those having ordinary skill in the art that individual nodes as depicted herein may represent a plurality of nodes (e.g. the first entity node 110 may represent multiple nodes under control of the first entity). Typically, a blockchain 170 is distributed amongst the first entity nodes 110 and the second entity nodes 120, where the blockchain is private or semi-private. Each first entity node 110 and second entity node 120 comprise a copy of the blockchain 170. In this way, the blockchain 170 is decentralized to provide for greater reliability of data as well as making the system less susceptible to failure. The blockchain 170 may comprise one or more data records 140 that contain information regarding resource transfers. In some embodiments, the information regarding resource transfers may include data on transfers from an account with the first entity to an account with the second entity. For instance, the first entity and the second entity may be financial institutions, and the resource transfer may be a transaction to transfer funds from one account to another. In such embodiments, the information about the transfer may include the amount of funds to be transferred, the accounts involved in the transaction, a timestamp of the transaction, and the like. The blockchain 170 may further comprise one or more pending data records 150 which are created when the system receives a request for a resource transfer. A pending data record 150 is a data record that has not been validated and/or authenticated by the system, and thus has not been added as a permanent block in the blockchain. The pending data record 150 may require that the nodes in the system validate the pending data record 150 through a consensus mechanism. For instance, if the pending data record 150 refers to a transaction between accounts held with the first entity and the second entity, the system may require a threshold number of first entity nodes 110 and second entity nodes 120 to confirm that the pending data record 150 is valid. The threshold number of nodes needed to validate the transaction may be selected to balance validation speed versus transaction reliability and security (i.e. requiring fewer nodes to validate a transaction may lead to higher computing speeds but relatively lower security and/or reliability, and vice versa). Once the pending data record 150 has been validated by the threshold number of first entity nodes 110 and second entity nodes 120, the pending data record 150 becomes a permanent, immutable data record 140 within the blockchain 170. Organizing data records 140 within the blockchain 170 in this manner ensures the authenticity of the information within the data records 140, which makes the blockchain 170 naturally tamper-resistant compared to traditional forms of data storage.

Typically, the system receives a resource transfer request from a user 170 via a user device 160. The user device 160 may be a mobile device such as a smartphone, tablet, or laptop, a personal computing device such as a desktop computer, smart device, single board computer, or a device owned and operated by an entity, such as a computer system terminal located on the entity's premises. It should be understood by those of ordinary skill in the art that the various devices and computing systems as depicted herein may be embodied in a single device or computing system or multiple devices and/or computing systems in a distributed manner. The user 170 may be an individual who owns an account with the first entity and wishes to execute a resource transfer, such as a real-time transfer of funds, to another individual who may own an account with a second entity. The user 170, through the user device 160, may log onto the first entity node 110 to upload a request for the resource transfer. Once a pending data record 150 is validated to become a data record 140 as described above, the resources are transferred in real time or near real time to the account of the recipient, and thus become available for use by the recipient in real time or near real time.

In some embodiments, the user 170 may, through the user device 160, be granted access to view the records for transactions in which the user was involved (e.g. instances in which the system was used to send or receive resources). In such embodiments, the system may selectively authorize and/or authenticate the user 170 to selectively provide the user with access to only those data records 140 to which the user was a party. The system may authenticate the user 170 using various authentication methods, which may include cryptographic keys, credentials such as a password or PIN, biometric data, and the like. The user 170 and the recipient of the resource transfer may each have a unique identifier within the system. The unique identifier may, for instance, be a user name, account ID, cryptographic hash, or the like. By utilizing unique identifiers in this way, the system allows users 170 to transfer and receive resources with one another without revealing sensitive personal information.

In some embodiments, the first entity node 110 and the second entity node 120 may further be in operative communication with a third party computing system 130 over the network 180. The third party computing system 130 may be owned and operated by a third party that wishes to access at least a portion of the data records 140 within the blockchain 170. For example, the third party may be a government or regulatory body that requires access to data records 140 on the blockchain 170 that involve the first entity, where the first entity may be a financial institution. The system may selectively grant access of said specific data records 140 to the third party computing system 130 while restricting access to other data records 140. In this way, the system provides an efficient and reliable way to provide snapshots of certain data records 140 within the blockchain 170 at a particular point in time.

In some embodiments, the system may utilize smart logic, such as smart contracts to control access to the data records 140 within the blockchain 170. "Smart contract" as used herein may refer to a computer program which executes certain transactions or processes based on the smart contract's protocols. For instance, a third party (e.g. a regulatory body) may require that entities disclose any and all transactions of funds over a certain threshold. The smart contract may be configured such that the third party computing systems 130 of certain third parties (e.g. the regulatory body, state or federal courts, etc.) are automatically sent a notification regarding transfers that exceed the threshold. The system may further automatically grant the third party computing systems 130 access to the data records 140 that contain information on said transfers exceeding the threshold. Due to the tamper-resistant nature of the blockchain 170, the third parties involved may be more confident in the authenticity of the information within the data records 140, which may be critically important for legal or regulatory applications.

FIG. 2 is a block diagram illustrating the first entity node 110, the second entity node 120, the third party computing system 130, and the user device 160 in more detail, in accordance with one embodiment of the present invention. The first entity node 110 typically contains a processor 221 communicably coupled to such devices as a communication interface 211 and a memory 231. The processor 221, and other processors described herein, typically includes circuitry for implementing communication and/or logic functions of the various computing systems, including the first entity node 110. For example, the processor 321 may include a digital signal processor device, a microprocessor device, and various analog to digital converters, digital to analog converters, and/or other support circuits.

The first entity node 110 may use the communication interface 211 to communicate with other devices over the network 180. The communication interface 211 as used herein may include an Ethernet interface, an antenna coupled to a transceiver configured to operate on a cellular data or WiFi signal, and/or a near field communication ("NFC") interface.

The first entity node 110 may include a memory 231 operatively coupled to the processor 221. As used herein, "memory" includes any computer readable medium (as defined herein below) configured to store data, code, or other information. The memory may include volatile memory, such as volatile Random Access Memory (RAM) including a cache area for the temporary storage of data. The memory may also include non-volatile memory, which can be embedded and/or may be removable. The non-volatile memory can additionally or alternatively include an electrically erasable programmable read-only memory (EEPROM), flash memory or the like. A blockchain application 241 may be stored within the memory 231 of the first entity node 110, where the blockchain application 214 comprises the code portions necessary for implementing and maintaining the blockchain. When executed, the blockchain application 241 may run the processes necessary functions to conduct resource transfers using the blockchain. Typically, the first entity node 110 is configured, through the blockchain application 241, to detect incoming requests for a resource transfer. Upon detecting an incoming request, the first entity node 110 may generate a pending data record which comprises information regarding the resource transfer, such as the amount of resource to be transferred, the sender's account information, the recipient's account information, the time of the transfer, and the like. The pending data record may be partially validated by a threshold number of first entity nodes 110 and await further validation by the threshold number of second entity nodes 120 to complete the validation process. The blockchain application 241 may further contain smart logic code portions such as smart contracts to automatically execute certain functions within the blockchain. For instance, a smart contract may automatically give access to certain data records to certain third parties, such as legal or regulatory bodies, based on certain criteria, such as amount of resources transferred, the entities involved in the transfer, the time of the transfer, and the like.

The second entity node 120 may comprise a communication interface 212, a processor 222, and a memory 232 having the blockchain application 241 stored thereon. The second entity node 120 may, through the blockchain application 241, detect that a pending data record has been generated by the first entity node 110. The second entity node 120 may further detect that the pending data record has been validated by the threshold number of first entity nodes 110. The second entity node 120 may then validate the pending data record using the threshold number of second entity nodes 120. Once both the first entity nodes 110 and the second entity nodes 120 have validated the pending data record, the pending data record is permanently appended to the preceding block in the blockchain.

The user device 160 may comprise a processor 226 operatively coupled to a communication interface 216 and a memory 236, the memory 236 having a user application 246 stored thereon. The user device 160 may be owned and operated by a user 170. Accordingly, the user device 160 may be a portable device such as a laptop, smart device, smartphone, tablet, and the like, or it may be a stationary device such as a desktop computer, Internet-of-things device, and the like. Typically, the user 170 interacts with the user device 160 through a user interface 256. The user interface 256 may comprise various devices and/or software needed to receive input and provide output to the user, which may include input devices such as keyboards, touchscreens, motion sensors, video/image cameras, biometric sensors, microphones, and the like, as well as output devices such as sound devices (e.g. speakers, headphones), display devices (e.g. screens, monitors, projectors), and the like. The user application 246 may comprise the software necessary for the user 170 to send resource transfer requests to the system and/or gain access to the data records for which the user 170 is authorized.

The third party computing system 130 typically also includes a processor 223 operatively coupled to a communication interface 213 and a memory 233. The memory 333 may contain a third party application 243 which allows the third party computing system 130 to gain access to a portion of the data records within the blockchain. The third party computing system 130 is typically owned and operated by a third party such as an entity such as a financial institution, a recipient of a resource transfer (e.g. a recipient of funds transferred by the user), a regulatory agency, a federal/state court, and the like. The smart contracts within the blockchain application 241 may be configured to automatically grant the third party computing system 130 with access to certain data records based on certain criteria. For instance, the smart contract may be configured to grant the access to a third party computing system 130 to all data records within the blockchain in which the third party either received or transferred resources. In other embodiments, the smart contract may grant access to a court or regulatory agency to provide the court with evidence of transactions that involve one or more entities specified by the court or regulatory agency.

FIG. 3 illustrates a process flow for executing a real-time resource transfer using a distributed ledger, in accordance with one embodiment of the present invention. The process begins at block 300, the system receives a resource transfer request from a user. Typically, the user sends the resource transfer request from a user device by logging onto the system using a unique identifier associated with the user. The unique identifier may, for instance, be an alphanumeric user ID, a PIN, a cryptographic hash, and the like. The resource transfer request may, for instance, be a request to transfer funds from the user's account with a first entity to a recipient's account. In some embodiments, the recipient's account may also be with the first entity. In other embodiments, the recipient's account may be with a second entity. The resource transfer request may further contain information about the transfer, such as the amount of funds to be transferred, the time at which the transfer is to take place (typically real-time or near real-time), and the like. In some embodiments, the resource transfer request may further include attached data, which may include data such as electronic documents, images, video/audio media files, and the like. The resource transfer request may further contain a unique identifier associated with the recipient of the resource transfer. In this way, the system may utilize unique identifiers to control the flow of resources without requiring its users to provide or receive sensitive personal information.

The process continues to block 301, where the system generates a pending data record on the blockchain. The system may extract the data from the resource transfer request to generate a pending data record, which as used herein may be a data record that has not yet been validated to become a permanent part of the blockchain. Typically, the pending data record contains the information provided by the user in the resource transfer request. For instance, if the resource transfer request is a request to transfer funds, the pending data record may contain information on the amount of funds to be transferred, the unique identifiers associated with the user and the recipient, any relevant attachments, and the like. In some embodiments, the system may identify the account from which funds are to be withdrawn based on the unique identifier associated with the user. The system may encrypt the unique identifier and/or account information of the user before including the information in the blockchain, such as by using a cryptographic hash. In this way, if the pending data record becomes a permanent data record on the blockchain, the unique identifier and/or account information of the user will not be accessible to subsequent third party viewers of the data record. At this stage, the pending data record has not yet been written to the blockchain. In some embodiments, the system may require that a threshold number of nodes validate the pending data record using a consensus mechanism. For instance, in the case of a transfer of funds between accounts of the same entity, the pending data record may only require validation by nodes within the first entity. That said, in embodiments in which the transfer of funds occurs between accounts of two distinct entities, the pending data record may require validation by a number of nodes within the first entity as well as a number of nodes within the second entity. In other words, both the first entity and second entity must verify and confirm that the transaction is valid before the pending data record is allowed to be written to the blockchain as a permanent data record.

The process continues to block 302, where the system validates the pending data record for a first entity. Typically, a threshold number of nodes within the first entity must validate the pending data record. To this end, the system may verify that the unique identifier of the user is associated with an account held with the first entity. The system may further verify that the account associated with the user has a sufficient amount of funds to cover the transfer, as found in the pending data record. In some embodiments, the system may require that a threshold number of first entity nodes validate the pending data record before it is added to the blockchain. The more first entity nodes are required to validate the pending data record, the more certainty the system gains in ensuring that the pending data record contains the correct information for a valid, authorized transaction. On the other hand, if fewer first entity nodes are required to validate the pending data record, validating the pending data record will lower computing resource requirements on the first entity nodes. Accordingly, the system may adjust the threshold upwards or downwards to achieve an optimum balance between security and efficiency.

The process continues to block 303, where the system detects that the pending data record has been validated by a second entity. The system may be configured such that the pending data record must further be validated by a threshold number of second entity nodes. For instance, if the transfer occurs between accounts held by distinct entities (e.g. the sender's account is held with the first entity while the recipient's account is held with the second entity), both entities must confirm the validity of the transaction in order to validate the pending data record. Accordingly, the second entity nodes may verify that the unique identifier associated with the recipient is associated with an existing account with the second entity. As was the case with the first entity nodes, the system may require that a threshold number of second entity nodes validate the transaction.

The process continues to block 304, where the system converts the pending data record to a permanent data record. Once the system verifies that the threshold number of first entity nodes and the threshold number of second entity nodes have validated the transaction, the system may convert the pending data record to a permanent data record. At this point, the system has recognized that the pending data record reflects information about a valid transaction and that the information within the pending data record has been authenticated to a sufficient level of confidence. The permanent data record is then ready to be immutably incorporated into the blockchain.

The process concludes at block 305, where the system appends the permanent data record to the blockchain. Once the permanent data record is appended to the blockchain, it becomes an immutable part of the blockchain. The permanent data record may contain a reference to the previous blockchain, where the reference may be a cryptographic hash. At this point, the funds have been transferred to the recipient's account, and the permanent data record is subject to the logic of any smart contracts within the blockchain application. For instance, if a smart contract exists that reports all transactions above a certain threshold to a third party, the permanent data record will be configured to be accessed by the third party if the permanent data record concerns a transaction that meets or exceeds said threshold. The process as described herein typically takes place in real-time or near real-time to provide an on-demand resource transfer process that integrates various platforms and technologies. In other words, the users of the system have no need to be aware of the compatibilities between the accounts in the system, and thus the system provides a secure and efficient way for users to transfer resources to one another.

Each communication interface described herein generally includes hardware, and, in some instances, software, that enables the computer system, to transport, send, receive, and/or otherwise communicate information to and/or from the communication interface of one or more other systems on the network. For example, the communication interface of the user input system may include a wireless transceiver, modem, server, electrical connection, and/or other electronic device that operatively connects the user input system to another system. The wireless transceiver may include a radio circuit to enable wireless transmission and reception of information.

In this way, the invention leverages a distributed ledger in the tracking of resource distributions and payment transactions along a life cycle. Payment transactions may be received at the entity, such as a financial institution across many payment rails, some of these rails may be message only transactions while others contain message and monetary value exchange as well. This system may allow for rail tracking of near real-time payment monetary value exchange processing.

A distributed ledger may create a viable technical solution by receiving payment requests coming from multiple external sources and networks that require near real-time analysis to determine the liquidity or position of the entity with the outside source as well as the overall position of the entity within the network and across the payment exchange.

The system provides a way to track a transaction, the current state of the transaction, the final position of the transaction, and the history of the transaction to allow authorized access to this information in efficient and disturbed way while ensuring only authorized updates are made and each update is confirmed immutable and accurate using the distributed ledger application.

As such the distributed ledger is constantly hooked or coded into the messaging process and is turned on and recording when desired, as such providing a transaction tracing implementation system response. Once access to the transaction is created and there is no slowdown in the network processing and the system can track the processing of the single transaction. In this way, the system may allow for immediate reconciliation of payment transactions for a selected time frame. In some embodiments, the system may allow for unconfirmed position analysis to estimate the value payment types are holding at certain intervals or in various accounts. In some embodiments, the system may allow for immutable/undeniable information about the transaction for audit, legal, and/or regulatory purposes. The system may impart limits on what level of payment information is available for visualization. In some embodiments, the system may allow for operational analysis such that the distributed ledger may be used to accurately predict if certain characteristics of a payment will lead to stalls in processing or the like.

The invention includes a distributed ledger that contains payment transactions that record value, payment type, and rail used for payment processing. Monetary transactions or store of value is not moved through the distributed ledger but recorded in the ledger in a state/status appropriate for its point in the life-cycle of the payment. Authorized access can be given to partner entities, internal organizations, systems and engines to evaluate financial positions, operation analysis, data analysis for predictive, prescriptive, and descriptive reporting.

As will be appreciated by one of ordinary skill in the art, the present invention may be embodied as an apparatus (including, for example, a system, a machine, a device, a computer program product, and/or the like), as a method (including, for example, a business process, a computer-implemented process, and/or the like), or as any combination of the foregoing. Accordingly, embodiments of the present invention may take the form of an entirely software embodiment (including firmware, resident software, microcode, and the like), an entirely hardware embodiment, or an embodiment combining software and hardware aspects that may generally be referred to herein as a "system." Furthermore, embodiments of the present invention may take the form of a computer program product that includes a computer-readable storage medium having computer-executable program code portions stored therein.

As the phrase is used herein, a processor may be "configured to" perform a certain function in a variety of ways, including, for example, by having one or more general-purpose circuits perform the function by executing particular computer-executable program code embodied in computer-readable medium, and/or by having one or more application-specific circuits perform the function.

It will be understood that any suitable computer-readable medium may be utilized. The computer-readable medium may include, but is not limited to, a non-transitory computer-readable medium, such as a tangible electronic, magnetic, optical, infrared, electromagnetic, and/or semiconductor system, apparatus, and/or device. For example, in some embodiments, the non-transitory computer-readable medium includes a tangible medium such as a portable computer diskette, a hard disk, a random access memory (RAM), a read-only memory (ROM), an erasable programmable read-only memory (EPROM or Flash memory), a compact disc read-only memory (CD-ROM), and/or some other tangible optical and/or magnetic storage device. In other embodiments of the present invention, however, the computer-readable medium may be transitory, such as a propagation signal including computer-executable program code portions embodied therein.

It will also be understood that one or more computer-executable program code portions for carrying out the specialized operations of the present invention may be required on the specialized computer include object-oriented, scripted, and/or unscripted programming languages, such as, for example, Java, Perl, Smalltalk, C++, SAS, SQL, Python, Objective C, and/or the like. In some embodiments, the one or more computer-executable program code portions for carrying out operations of embodiments of the present invention are written in conventional procedural programming languages, such as the "C" programming languages and/or similar programming languages. The computer program code may alternatively or additionally be written in one or more multi-paradigm programming languages, such as, for example, F #.

Embodiments of the present invention are described above with reference to flowcharts and/or block diagrams. It will be understood that steps of the processes described herein may be performed in orders different than those illustrated in the flowcharts. In other words, the processes represented by the blocks of a flowchart may, in some embodiments, be in performed in an order other that the order illustrated, may be combined or divided, or may be performed simultaneously. It will also be understood that the blocks of the block diagrams illustrated, in some embodiments, merely conceptual delineations between systems and one or more of the systems illustrated by a block in the block diagrams may be combined or share hardware and/or software with another one or more of the systems illustrated by a block in the block diagrams. Likewise, a device, system, apparatus, and/or the like may be made up of one or more devices, systems, apparatuses, and/or the like. For example, where a processor is illustrated or described herein, the processor may be made up of a plurality of microprocessors or other processing devices which may or may not be coupled to one another. Likewise, where a memory is illustrated or described herein, the memory may be made up of a plurality of memory devices which may or may not be coupled to one another.

It will also be understood that the one or more computer-executable program code portions may be stored in a transitory or non-transitory computer-readable medium (e.g., a memory, and the like) that can direct a computer and/or other programmable data processing apparatus to function in a particular manner, such that the computer-executable program code portions stored in the computer-readable medium produce an article of manufacture, including instruction mechanisms which implement the steps and/or functions specified in the flowchart(s) and/or block diagram block(s).

The one or more computer-executable program code portions may also be loaded onto a computer and/or other programmable data processing apparatus to cause a series of operational steps to be performed on the computer and/or other programmable apparatus. In some embodiments, this produces a computer-implemented process such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with operator and/or human-implemented steps in order to carry out an embodiment of the present invention.

While certain exemplary embodiments have been described and shown in the accompanying drawings, it is to be understood that such embodiments are merely illustrative of, and not restrictive on, the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations and modifications of the just described embodiments can be configured without departing from the scope and spirit of the invention. Therefore, it is to be understood that, within the scope of the appended claims, the invention may be practiced other than as specifically described herein.

What is claimed is:

1. A system for processing a real-time resource transfer using distributed ledger technology, the system comprising:
   a processor;
   a communication interface; and
   a memory having a blockchain application stored therein, wherein the blockchain application comprises computer instruction code configured to interact with a blockchain, where said blockchain comprises a plurality of data records, wherein the blockchain application, when executed by the processor, causes the processor to:
   receive a resource transfer request from a user device to transfer an amount of resources from a first user to a second user;
   generate a pending data record on the blockchain, wherein the pending data record comprises the resource transfer request;
   receive a first validation of the pending data record, wherein the first validation comprises: 1) verification that a first unique identifier associated with the first user is associated with a first user account associated with the first user, and 2) verification that the first user account comprises sufficient resources for the resource transfer request;
   receive a second validation of the pending data record, wherein the second validation comprises verification that a second unique identifier associated with the second user is associated with a second user account associated with the second user;
   convert the pending data record to a permanent data record;
   append the permanent data record to the blockchain; and
   transfer, in real-time, the resources from the first user to the second user.

2. The system according to claim 1, wherein the blockchain application further causes the processor to:
   read the data within the permanent data record;
   detect that data within the permanent data record references an amount of resources over a threshold; and
   selectively authorize a third party computing system to access the permanent data record.

3. The system according to claim 1, wherein receiving the first validation of the pending data record comprises verifying that a threshold number of first entity nodes have validated the pending data record.

4. The system according to claim 1, wherein receiving the second validation of the pending data record comprises verifying that a threshold number of second entity nodes have validated the pending data record.

5. The system according to claim 1, wherein the pending data record comprises identifier data, the identifier data comprising the first unique identifier associated with the first user and the second unique identifier associated with the second user.

6. The system according to claim 1, wherein receiving the first validation of the pending data record comprises receiving the first validation from a first node associated with a first entity and wherein receiving the second validation of the pending data record comprises receiving the second validation from a second node associated with a second entity.

7. A computer program product for processing a real-time resource transfer using distributed ledger technology, the computer program product comprising at least one non-transitory computer readable medium having computer-readable program code portions embodied therein, the computer-readable program code portions comprising executable portions for:
   receiving a resource transfer request from a user device to transfer an amount of resources from a first user to a second user;
   generating a pending data record on a blockchain comprising a plurality of data records, wherein the pending data record comprises the resource transfer request;
   receiving a first validation of the pending data record, wherein the first validation comprises: 1) verification that a first unique identifier associated with the first user is associated with a first user account associated with the first user, and 2) verification that the first user account comprises sufficient resources for the resource transfer request;
   receiving a second validation of the pending data record, wherein the second validation comprises verification that a second unique identifier associated with the second user is associated with a second user account associated with the second user;
   converting the pending data record to a permanent data record;
   appending the permanent data record to the blockchain; and
   transferring, in real-time, the resources from the first user to the second user.

8. The computer program product according to claim 7, the computer-readable program code portions further comprising executable portions for:
   reading the data within the permanent data record;
   detecting that data within the permanent data record references an amount of resources over a threshold; and
   selectively authorizing a third party computing system to access the permanent data record.

9. The computer program product according to claim 7, wherein receiving the first validation of the pending data record comprises verifying that a threshold number of first entity nodes have validated the pending data record.

10. The computer program product according to claim 7, wherein receiving the second validation of the pending data record comprises verifying that a threshold number of second entity nodes have validated the pending data record.

11. The computer program product according to claim 7, wherein the pending data record comprises identifier data, the identifier data comprising the first unique identifier associated with the first user and the second unique identifier associated with the second user.

12. The computer program product according to claim 11, wherein receiving the first validation of the pending data record comprises receiving the first validation from a first node associated with a first entity and wherein receiving the second validation of the pending data record comprises receiving the second validation from a second node associated with a second entity.

13. A computer-implemented method for processing a real-time resource transfer using distributed ledger technology, said method comprising:
  receiving a resource transfer request from a user device to transfer an amount of resources from a first user to a second user;
  generating a pending data record on a blockchain comprising a plurality of data records, wherein the pending data record comprises the resource transfer request;
  receiving a first validation of the pending data record, wherein the first validation comprises: 1) verification that a first unique identifier associated with the first user is associated with a first user account associated with the first user, and 2) verification that the first user account comprises sufficient resources for the resource transfer request;
  receiving a second validation of the pending data record, wherein the second validation comprises verification that a second unique identifier associated with the second user is associated with a second user account associated with the second user validation of the pending data record from a second node associated with a second entity, wherein the validation of the pending data record from the second node comprises verification that a second unique identifier associated with the second user is associated with a second user account associated with the second user;
  converting the pending data record to a permanent data record;
  appending the permanent data record to the blockchain; and
  transferring, in real-time, the resources from the first user to the second user.

14. The computer-implemented method according to claim 13, the method further comprising:
  reading the data within the permanent data record;
  detecting that data within the permanent data record references an amount of resources over a threshold; and
  selectively authorizing a third party computing system to access the permanent data record.

15. The computer-implemented method according to claim 13, wherein receiving the first validation of the pending data record comprises verifying that a threshold number of first entity nodes have validated the pending data record.

16. The computer-implemented method according to claim 13, wherein receiving the second validation of the pending data record comprises verifying that a threshold number of second entity nodes have validated the pending data record.

17. The computer-implemented method according to claim 13, wherein the pending data record comprises identifier data, the identifier data comprising the first unique identifier associated with the first user and the second unique identifier associated with the second user.

18. The computer-implemented method according to claim 13, wherein receiving the first validation of the pending data record comprises receiving the first validation from a first node associated with a first entity and wherein receiving the second validation of the pending data record comprises receiving the second validation from a second node associated with a second entity.

* * * * *